United States Patent
Andrei et al.

(10) Patent No.: US 9,953,050 B2
(45) Date of Patent: Apr. 24, 2018

(54) GARBAGE COLLECTION OF VERSIONS DRIVING THE GARBAGE COLLECTION OF MULTI-VERSION CONCURRENCY CONTROL TIMESTAMPS

(71) Applicants: Mihnea Andrei, Issy les Moulineaux (FR); Ivan Schreter, Mannheim (DE); Amarnadh Eluri, San Francisco, CA (US); Thorsten Glebe, Leimen (DE); Eunsang Kim, Seoul (KR)

(72) Inventors: Mihnea Andrei, Issy les Moulineaux (FR); Ivan Schreter, Mannheim (DE); Amarnadh Eluri, San Francisco, CA (US); Thorsten Glebe, Leimen (DE); Eunsang Kim, Seoul (KR)

(73) Assignee: SAP SE, Walldorf (DE)

( * ) Notice: Subject to any disclaimer, the term of this patent is extended or adjusted under 35 U.S.C. 154(b) by 684 days.

(21) Appl. No.: 14/579,162

(22) Filed: Dec. 22, 2014

(65) Prior Publication Data
US 2016/0147812 A1 May 26, 2016

Related U.S. Application Data

(60) Provisional application No. 62/845,000, filed on Nov. 25, 2014.

(51) Int. Cl.
*G06F 7/00* (2006.01)
*G06F 17/00* (2006.01)
*G06F 17/30* (2006.01)

(52) U.S. Cl.
CPC .............................. *G06F 17/30353* (2013.01)

(58) Field of Classification Search
CPC ......... G06F 17/30353; G06F 17/30356; G06F 12/0253; G06F 12/0269; G06F 17/30592
See application file for complete search history.

(56) References Cited

U.S. PATENT DOCUMENTS

| | | | | |
|---|---|---|---|---|
| 5,287,496 A | * | 2/1994 | Chen | G06F 17/30356 |
| 5,701,480 A | * | 12/1997 | Raz | G06F 9/466 |
| | | | | 714/19 |
| 6,351,753 B1 | * | 2/2002 | Jagadish | G06F 17/30356 |
| 7,293,028 B2 | * | 11/2007 | Cha | G06F 17/30351 |
| 8,396,831 B2 | * | 3/2013 | Larson | G06F 17/30356 |
| | | | | 707/638 |

(Continued)

*Primary Examiner* — Hasanul Mobin
(74) *Attorney, Agent, or Firm* — Sterne, Kessler, Goldstein & Fox P.L.L.C.

(57) ABSTRACT

Disclosed herein are system, method, and computer program product embodiments for performing garbage collection on a multi-version concurrency control information in the database management system. An embodiment operates by determining, using multi-version concurrency control (MVCC) information, when a row manipulated by a write transaction is visible to a plurality of readers accessing a table that includes the row. The MVCC information for the row includes at least a creation timestamp, a destruction timestamp and a row state. Once the row is visible to the plurality of readers, garbage collecting at least the creation timestamp or the destruction timestamp in the MVCC information. After the creation timestamp or destruction timestamp have been garbage collected, the plurality of readers use the row state to determine accessibility of the row in the table.

20 Claims, 5 Drawing Sheets

(56) References Cited

U.S. PATENT DOCUMENTS

| | | | |
|---|---|---|---|
| 2003/0033328 A1* | 2/2003 | Cha | G06F 17/30351 |
| 2005/0198088 A1* | 9/2005 | Subramoney | G06F 17/30348 |
| 2006/0167960 A1* | 7/2006 | Lomet | G06F 17/30353 |
| 2007/0233683 A1* | 10/2007 | Verma | G06F 9/466 |
| 2009/0327372 A1* | 12/2009 | Ylonen | G06F 12/0253 |
| 2011/0252000 A1* | 10/2011 | Diaconu | G06F 17/30501 |
| | | | 707/638 |
| 2011/0302143 A1* | 12/2011 | Lomet | G06F 17/30008 |
| | | | 707/704 |
| 2012/0102006 A1* | 4/2012 | Larson | G06F 17/30575 |
| | | | 707/703 |
| 2013/0198139 A1* | 8/2013 | Skidanov | G06F 17/30289 |
| | | | 707/649 |
| 2014/0149353 A1* | 5/2014 | Lee | G06F 17/30356 |
| | | | 707/639 |
| 2015/0120687 A1* | 4/2015 | Bhattacharjee | G06F 17/30362 |
| | | | 707/704 |
| 2015/0379060 A1* | 12/2015 | Levandoski | G06F 17/30353 |
| | | | 707/607 |

* cited by examiner

GARBAGE COLLECTION OF VERSIONS DRIVING THE GARBAGE COLLECTION OF MULTI-VERSION CONCURRENCY CONTROL TIMESTAMPS

CROSS REFERENCE TO RELATED APPLICATIONS

This application claims the benefit of the U.S. Provisional Application No. 62/084,500 filed on Nov. 25, 2014, which is incorporated by reference herein in its entirety.

BACKGROUND

Data frequently changes in rows of tables of a database management system. Concurrency control (CC) protocols are designed to maintain consistency during these data changes, as well as improve the throughput of the database management system. One way to maintain CC is to maintain a snapshot of a table in the database management system, where a snapshot is created at a particular time.

A multi-version concurrency control (MVCC) is a CC mechanism that uses the snapshot mechanism. In the MVCC mechanism, when a read thread reads a row from a table, the write thread may write to the row in the table without being blocked by the read thread. In the MVCC mechanism, the database management system stores MVCC information that read and write threads query to determine which rows in a table can be accessed. When the write threads commit changes to the rows in the table, the changes eventually become visible to all read threads and MVCC information associated with these rows is removed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for garbage collecting timestamps from the multi-version concurrency control information in the database management system.

Figure 1:
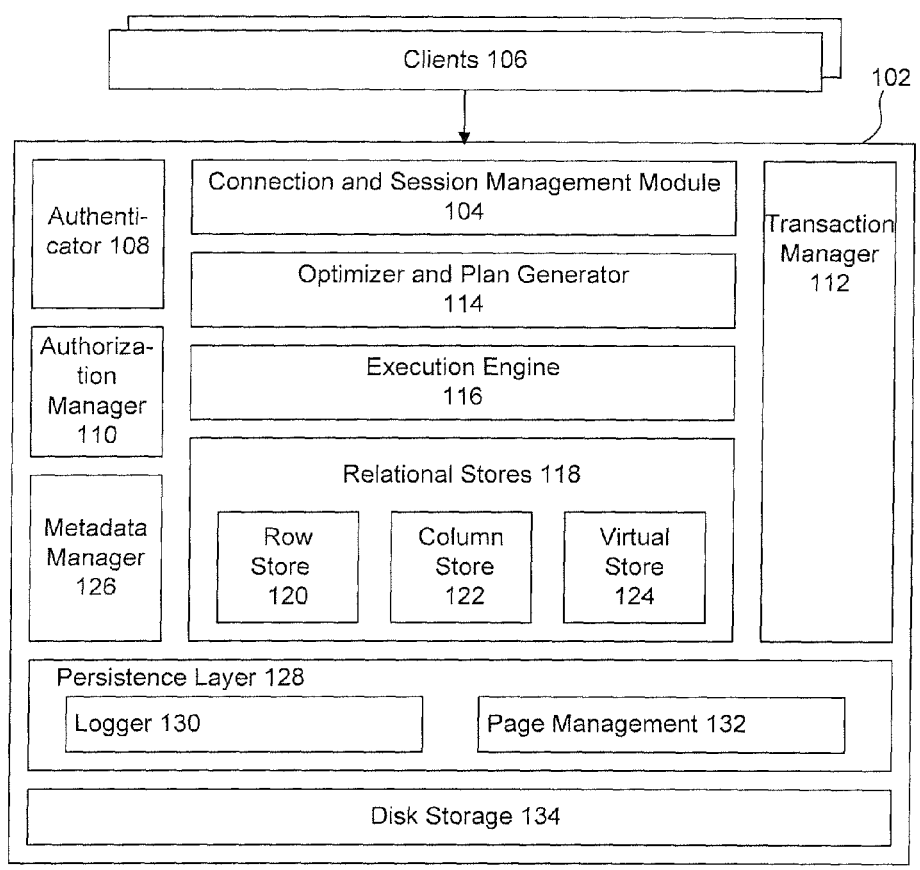
FIG. 1 is a block diagram of a database management system, according to an example embodiment.

FIG. 1 is a block diagram 100 of an exemplary database management system. Database management system 102 may be a memory-centric data management system that leverages hardware capabilities, such as vast main memory space and multi core CPU and GPU processors, described in detail in FIG. 5.

In an embodiment, database management system 102 includes a connection and session management module 104. Connection and session management module 104 creates and manages sessions and connections for database clients or simply clients 106. Clients 106 may be computing devices under a control of a user (also referred to as client devices) that access and/or execute business applications. Business applications are custom or generic applications that include applications related to social media, bio-informatics, and business processing, to name a few examples, and that store and manipulate data in database management system 102.

Once connection and session management module 104 establishes a session with database management system 102, clients 106 may use one or more database languages, to manipulate data. Database languages include a structured query language (SQL), SQL Script (a scripting language for describing application specific calculations inside the database), a MultiDimensional eXpressions (MDX), WIPE (weakly structure information processing and exploration) for data graph processing and FOX (for planning applications), to give a few examples.

In an embodiment, an established connection may be authenticated using authenticator 108. Authenticator 108 authenticates clients 106 to database management system 102. For example, authenticator 108 verifies that a user using client 106 has a necessary user name and password to access data in database management system 102.

In an embodiment, database management system 102 includes an authorization manager 110. Authorization manager 110 determines whether a user has the required privileges to execute the requested operations. A privilege grants a right to perform a specified operation (such as create, update, select, or execute).

Transaction manager 112 is a component that coordinates transactions, controls transactional isolation and keeps track of active and committed transactions.

In an embodiment, client 106 may issue a client request to database management system 102. The client request may manipulate one or more rows in a table of a database management system 102. For example, the client request may insert, update or delete data to or in a particular row of a table.

When database management system 102 receives a client request, the client request may initially be processed in accordance with the language of the client request, such as, SQL, SQL script, MDX, WIPE, FOX, etc. For example, a client request including a SQL statement may be processed using a SQL processor (not shown). The SQL processor processes structured data, such as row- and column-oriented physical representations of relational tables in database management system 102.

In another example, WIPE statement may be processed using a graphics processor that processes unstructured data that is stored as data graphs.

After the initial processing, the client request may be converted into a format that is common to processing requests in database management system 102 and forwarded to an optimizer and plan generator 114. In an embodiment, optimizer and plan generator 114 parses and optimizes the client requests. For example, optimizer and plan generator 112 may generate an execution plan for executing the client request in database management system 102. Once generated, optimizer and plan generator 114 passes the execution plan to execution engine 116.

In an embodiment, execution engine 116 processes the execution plan. To process the execution plan, execution engine 116 accesses data stored in tables of database management system 102. Example tables may be stored in relational stores 118. Relational stores 118 may include a row store 120 and a column store 122. In an embodiment, relational stores 118 may be included in one or more memory structures that are discussed in detail in FIG. 5.

In an embodiment, row store 120 stores relational tables in a row format.

In an embodiment, column store 122 stores relational tables in a column format.

In an embodiment, relational store 118 also includes a virtual store 124. Virtual store 124 is a virtual relational data store that provides access to remote data in external systems through virtual tables. These virtual tables can be accessed through virtual store 124 using, for example, SQL statements.

In an embodiment, metadata manager 126 manages metadata in database management system 102. Example metadata includes definitions of relational tables, columns, views, indexes and procedures. In an embodiment, metadata manager 126 may be coupled to a database catalog for relational stores 118. In one embodiment, the database catalog may be stored in tables in row store 120.

In an embodiment, persistence layer 128 provides durability and atomicity to transactions. For example, persistence layer 128 ensures that data in database management system 102 is restored to the most recent committed state after a restart and that transactions are either completely executed or completely undone. To achieve this goal in an efficient way, persistence layer 128 may use a combination of write-ahead logs, shadow paging and savepoints. In an embodiment, persistence layer 128 also offers interfaces for writing and reading persisted data.

In an embodiment, persistence layer 128 includes a logger 130. Logger 130 logs data, changes in data, and transaction requests to a memory storage disk. Those transactions and data changes may be performed by execution engine 116.

Page management module 132 provides an interface for writing and reading data from memory cache and disk storage for processing from row store 118.

Disk storage 134 is a long term memory storage that stores data. For example, data stored in row stores 118 that is no longer frequently accessed may be moved to disk storage 134. Exemplary disk storage 134 may be one of non-volatile memories that are discussed in detail in FIG. 5. When client 106 requests data in disk storage 134, database management system 102 may move the data from disk storage 134 into row store 118. Once moved, the database management system 102 may send the data to client 106 as part of a response message.

Figure 2:
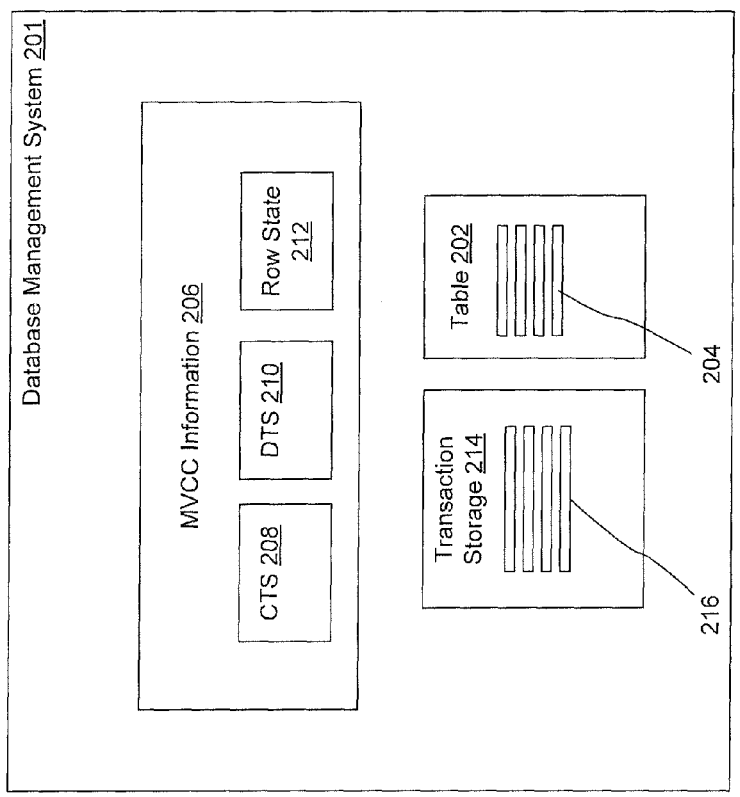
FIG. 2 is a block diagram of a database management system that includes MVCC information, according to an example embodiment.

FIG. 2 is a block diagram 200 of a database management system that includes MVCC information, according to an embodiment. Database management system 201 may include some or all components of database management system 102. Additionally, database management system 201 may be a combination of memory storage coupled with modules that execute on a processor, such that the processor executes instructions on database management system 201, as discussed in FIG. 5.

Database management system 201 includes one or more tables 202. Tables 202 include multiple rows 204 that store data in a row or column format. When client 106 issues instructions that manipulate data in database management system 201, these instructions may manipulate data in rows of a table, such as table 202. For example, client 106 may issue instructions that include insert, update, or delete operations on rows 204 in tables 202 in database management system 201. In an embodiment, one or more instructions may be referred to as transactions. These transactions are active transactions. Active transactions temporarily manipulate data in database management system 201 before transactions are committed. Active transactions become permanent transactions when client 106 issues a "commit" instruction. Upon a "commit" instruction, the data changes made to rows 204 of table 202 by active transactions become permanent.

In an embodiment, when a transaction is an active transaction, multiple clients 106 can issue requests that manipulate or access data in row 204 of the same table 202. For example, a request from each client 106 can spawn a database management system thread that performs transactions for a particular client 106 in parallel with other threads for other clients 106 on table 202. Further some of these threads are readers or read threads that read data from table 202, while other threads are writers or write threads that insert, update, and delete one or more rows 204 from table 202. In an embodiment, a write thread treats an update to one or more rows 204 in table 202 as a delete of one or more rows 204 followed by an insert of the one or more rows 204. A read and write thread may be a thread that is instantiated at system start-up that reads or writes data from table 202. In an embodiment, database management system 201 may instantiate multiple read and write threads that operate in parallel with each other. Additionally the embodiments below are not limited to threads and can be implemented using other components in the database management system 201 and computer system discussed in FIG. 5.

In an embodiment, database management system 201 implements a snapshot mechanism to track changes to rows 204 made by multiple write threads. For example, when a write thread writes data to table 202, a write thread creates a new snapshot of a table, such as table 202. The new snapshot of a table consists only of rows 204 that have been created and rows 204 that have been destroyed. In a further embodiment, the new snapshot of the table may consist of rows 204 that have been created or destroyed and may be merged with table 202 when client 106 commits a transaction. After the merge, the new snapshot of the table may be destroyed.

Because multiple write threads create multiple snapshots of a table, where each snapshot of the table may include different rows while a transaction is active, database management system 201 also includes MVCC information 206. MVCC information 206 is used by multiple write threads to store visibility information on rows 204 and multiple read threads to determine which rows 204 in table 202 are visible and accessible for reading. For example, one or more read threads query MVCC information 206 to determine which data from rows 204 in table 202 is visible and accessible for reading, and one or more write threads store information in MVCC information 206 for rows 204 that have been created or destroyed, that is, inserted, deleted, and updated in table 202.

As discussed above, MVCC information 206 stores information on rows 204 that have been created or destroyed. Example information may be stored in a column format, and includes a creation timestamp 208 (referred to as CTS 208), a destruction timestamp 210 (referred to as DTS 210), and row visibility state information 212 (referred to as row state 212) for each row 204 that a write thread created or destroyed in table 202. In an embodiment, database management system 201 may store CTS 208, DTS 210 and row state 212 at a location in MVCC information 206 that is calculated using the row position or offset information that database management system 201 used to create or destroy row 204 in table 202.

In an embodiment, CTS 208 stores a commit timestamp of a transaction that created row 204. Before the transaction that created row 204 was committed, CTS 208 may store a reference to a memory location that may store the temporary creation information, or CTS 208 may store a temporary timestamp. In an embodiment, DTS 210 stores a commit timestamp of a time that a transaction destroyed row 204. Before transaction that destroyed row 204 was committed, DTS 210 may store a reference to a memory location that may store the destruction information or DTS 210 may store a temporary timestamp. The reference to the memory location or temporary timestamp in CTS 208 and DTS 210 indicate that transaction is an active transaction. In an embodiment, CTS 208 and DTS 210 may be 8 bytes or 64 bits in size, though the implementation is not limited to this embodiment.

In an embodiment, row state 212 stores row state information for row 204. Row state 212 determines visibility of row 204 to read threads in database management system 201. In an embodiment, row state 212 stores information that may be redundant to information stored in CTS 208 and DTS 210, but in a smaller memory space than allocated for CTS 208 and/or DTS 210. Example row state information may include "visible," "invisible," "check CTS," and "check CTS and DTS" states. A "visible" state indicates that row 204 has been created and is visible to one or more read threads that access table 202. An "invisible" state indicates that row 204 has been destroyed and is invisible to one or more read threads that access row 204. When row state 212 is set to either "visible" or "invisible" for row 204, a read thread does not need to query CTS 208 or DTS 210 to determine visibility of row 204, but may rely on the visibility of row 204 as set in row state 212. A "check CTS" state indicates that row 204 may be visible to some, but not all read threads, and a thread may access CTS 208 to determine whether row 204 is visible or invisible to the thread. A "check CTS and DTS" state indicates that some, but not all, read threads may access CTS 208 and DTS 210 to determine whether row 204 is visible or invisible to the read thread. In a further embodiment, row state 212 may be 2 bits in size, where a unique combination of the two bits may be used to set each of the states discussed above.

In an embodiment, database management system 201 stores transactions in transaction storage 214. Transaction storage 214 may be a log file or a memory space maintained in one or more memories discussed in FIG. 5. Transactions stored in transaction storage 214 may be "committed" and "uncommitted" transactions.

In an embodiment, transactions and instructions processed by write threads may be stored in transaction storage 214. As discussed above, each transaction may include one or more instructions that manipulate data in one or more rows 204. Transaction storage 214 stores these instructions, and information about rows 204 that results from these instructions, as associations 216. Associations 216 may include access information to row 204 in table 202, such as a row identifier in table 202, a row position or offset of row 204 in a storage container that implements table 202, and a type of instruction. Example instructions types may be an insert, delete or update operations. As discussed above, an update operation may be treated as a delete operation followed by an insert operation.

In an embodiment, when a write thread creates or destroys row 204 from table 202, the write thread updates MVCC information 206 associated with the created or destroyed row 204. In an embodiment, to determine CTS 208, DTS 210 and row state 212 for a particular row 204, a write thread may use associations 216 in transaction storage 214. As described above, transaction storage 214 stores row position of row 204 as one of associations 216. The write thread then uses the row position to determine the location of CTS 208, DTS 210 and row state 212 associated with row 204 in MVCC information 206.

In an embodiment, when a write thread inserts row 204 into table 202, the write thread also updates CTS 208 and sets row state 212 to "check CTS" state. When an insert transaction is active, database management system 201 does not have a timestamp for the insert operation and instead of a timestamp, the write thread may insert a temporary timestamp in CTS 208. The temporary timestamp may be a placeholder in CTS 208 that indicates that row 204 has been created but that the transaction is active and might have been committed but not post-committed in database management system 201. In an embodiment, transaction is post-committed in database management system 201 when a post-commit thread replaces the temporary timestamp in CTS 208 and/or DTS 210 with the commit timestamp after the commit of the transaction.

In an embodiment, when a write thread destroys row 204 from table 202, the write thread also updates DTS 210 and sets row state 212 with "check CTS and DTS" state. As with the insert operation, the write thread also inserts a temporary timestamp in DTS 210 before the write thread commits the delete operation in database management system 201.

Once transactions are committed, changes to the data from the committed transactions become visible to some or all read threads in database management system 201. For example, rows 204 with data that were created in table 202 may become visible to multiple read threads and rows 204 with data that were destroyed may become invisible to multiple read threads.

In an embodiment, database management system 201 determines whether rows 204 that were created or destroyed are visible to one or more read threads based on MVCC information 206 for rows 204, data in transaction storage 214, and the thread read timestamp of the reader threads. In an embodiment, the thread read timestamp may be a system timestamp of when a read thread began processing an instruction from client 106 and reflects the snapshot of a state of table 202 at that time.

In an embodiment, after a write thread commits a transaction, a post-commit thread in database management system 201 also updates MVCC information 206. A post-commit thread may be a thread that is instantiated at system start-up that performs a post-commit process on CTS 208 and DTS 210 in database management system 210. For example, when a write thread commits a transaction, the commit timestamp of the transaction may be written into transaction storage 214. A commit timestamp may be a system timestamp of a time the write thread committed the transaction. After the commit, a post-commit thread parses transaction storage 214 and retrieves associations 216 for rows 204 whose transactions have been committed along with the commit timestamp and the instruction type. The post-commit thread then uses the row position information in associations 216 to access MVCC information 206 for corresponding row 204. Once accessed, the post-commit thread uses the instruction type to update CTS 208 and/or DTS 210 information with a commit timestamp for row 204 corresponding to a committed transaction. For example, when instruction type indicates that row 204 has been created in table 202, the post-commit thread updates CTS 208 with the commit timestamp. In another example, when instruction type indicates that row 204 has been destroyed from table 202, the post-commit thread updates DTS 210 with the commit timestamp.

To determine whether transactions are visible to one or more read threads, database management system may use timestamp comparison or check row state 212. For example, for transactions where row state 212 is set to "visible" or "invisible", a read thread may determine row accessibility based on row state 212.

For transactions where row state 212 is set to "check CTS", a read thread compares a thread read timestamp to a timestamp stored in CTS 208. For transactions where row state 212 is set to "check CTS and DTS", a read thread compares the thread read timestamp to CTS 208 and DTS 210. For example, if the thread read timestamp is less than the commit timestamp stored in the CTS 208, the read thread began executing before a row associated with the CTS 208 was committed and the row would not be visible to the read thread. In another example, if the thread read timestamp of a read thread is greater than the commit timestamp, the read thread began executing after the write thread committed the row, and the row is visible to the read thread. In another example, if the thread read timestamp is less than DTS 210, the read thread began executing before a row associated with DTS 210 was destroyed and committed, and the row would be visible to the read thread. In another example, if the thread read timestamp of a read thread is greater than the commit timestamp, the read thread began executing after the write thread committed the row, and the row would be invisible to the read thread.

In an embodiment, at a certain point in time after a write thread commits transactions, the transactions become visible to all read threads. In one example, this occurs when the read threads have thread read timestamps that indicate that the read threads began processing instructions after the write thread committed transactions that created or destroyed rows 204. Because all threads began executing after the write thread committed transactions, changes to rows 204 are visible to all read threads that access table 202.

In another example, a certain point in time may occur when the read thread with an oldest read thread timestamp completes execution, and database management system 201 finds the next oldest read thread with the next oldest read thread timestamp. In this case, the transactions that committed by one or more write threads between the oldest thread read timestamp and the next oldest thread read timestamp become visible to all existing read threads in database management system 201. To determine rows 204 that become visible, database management system 201 may compare the commit timestamps of transactions that acted on rows 204 to the next oldest read thread timestamp, which becomes the oldest read thread timestamp.

When changes to rows 204 become visible to all read threads, MVCC information 206 that includes CTS 208 and DTS 210 is no longer required, and database management system 201 can rely on row state 212 to determine visibility of rows 204. Resources in database management system 201 that are no longer required may be garbage collected. Garbage collection removes resources that database management system 201 no longer requires, so that the resources may be reused by other components of database management system 201. For example, CTS 208 or DTS 210 for rows 204 that are visible to all read threads is no longer required because the changes to these rows 204 are visible to the read threads. Because CTS 208 and DTS 210 for rows 204 is no longer required, CTS 208 and DTS 210 for these rows 204 may be garbage collected and reused to store creation and destruction timestamps for newly created and destroyed rows that are not visible to all read threads.

In an embodiment, database management system 201 may instantiate a clean-up thread to perform garbage collection of MVCC information 206. A clean-up thread may be a thread that is instantiated at system start-up that garbage collects different resources in database management system 210. In an embodiment, database management system 201 may instantiate multiple clean-up threads.

To perform garbage collection on MVCC information 206, the clean-up thread first determines CTS 208 and DTS 210 that can be garbage collected. To determine which CTS 208 and DTS 210 can be garbage collected, the clean-up thread identifies a minimum read timestamp. The minimum read timestamp is a snapshot timestamp for a time when all rows 204 in table 202 are treated as committed and accessible to all read threads. That is, all rows 204 that have been created in table 202 are visible and all rows 204 that have been destroyed from table 202 are invisible to all read threads in database management system 201. In an embodiment, minimum read timestamp is a thread read timestamp that is associated with an oldest read thread that reads rows 204 in table 202. When the oldest read thread completes execution, the minimum read timestamp is associated with the next oldest read thread. In this case, transactions in transaction storage 214 on rows 204 that committed between the old minimum read timestamp of the oldest read thread and the new minimum read timestamp of the next oldest thread become visible to all read threads.

To determine rows 204 for which transactions committed between the old minimum read timestamp and the new minimum read timestamp, the clean-up thread traverses through associations 216 in transaction storage 214 and determines which rows 204 are associated with transactions that have a commit timestamp between the old minimum read timestamp and the new minimum read timestamp. These rows 204 are visible or invisible to all read threads. When the clean-up thread finds associations 216 that are associated with transactions for rows 204 where a commit timestamp is less than the new minimum read timestamp, the clean-up thread uses association 216 to locate the corresponding CTS 208 and/or DTS 210 and row state 212 for rows 204 in MVCC information 206. For example, the clean-up thread uses the row position stored in association 216 to locate the corresponding CTS 208 and/or DTS 210 for a particular row 204. Once the clean-up thread locates CTS 208, DTS 210 and row state 212, if association 216 indicates that the transaction creates row 204, the clean-up thread sets row state 212 to "visible" and replaces the timestamp in CTS 208 with zeroes. If association 216 indicates that the transaction destroys row 204, the clean-up thread sets row state 212 to "invisible" and replaces the timestamp in DTS 210 with zeroes.

When the clean-up thread replaces CTS 208 and/or DTS 210 with zeroes, the clean-up thread garbage collects CTS 208 and DTS 210. Garbage collecting CTS 208 and DTS 210 poses several advantages in database management system 201. First, CTS 208 and DTS 210 include memory overhead that is equal to the size of CTS 208 and DTS 210 for each row 204. For example, if the size of CTS 208 and DTS 210 is 8 bytes each, the memory overhead of MVCC information 206 for each row 204 is 16 bytes plus the size of row state 212. However, when CTS 208 and DTS 210 are garbage collected, database management system 201 may use row visibility state 212 to determine visibility of rows 204. As row visibility state 212 is 2 bits per row 204 and not 16 bytes (128 bits), database management system 201 saves memory overhead by garbage collecting CTS 208 and DTS 210 when the visibility may be determined from row state 212. Second, database management system 201 avoids an expensive timestamp comparison of each CTS 208 and DTS 210 timestamp with the thread read timestamp of each read thread that accesses row 204. For example, the read thread now determines whether its thread read timestamp is greater or less than the CTS 208 and DTS 210 for each row 204 that the read thread attempts to access in table 202 when row state 212 is set to "check CTS" or "check CTS and DTS," and not for all rows 204. Instead, the read thread queries row state 212 to determine visibility of row 204. As most rows 204 of table 202 exist a long time, rows 204 where rows state 212 is set to "visible" or "invisible" make up the majority of rows 204 in table 202, and rows 204 that have been recently created or destroyed and have CTS 208 and DTS 210 timestamps that are not set to zeroes make up minority of rows 204 in table 202. As such, most read threads query row state 212 to determine visibility of rows 204, and query CTS 208 and DTS 210 for a minority of rows 204 when row state 212 set to "check CTS" or "check CTS and DTS", that is, before CTS 208 and DTS 210 have been garbage collected.

Once the clean-up thread sets row state 212 of row 204 in MVCC information 206 as "visible" or "invisible," the read threads in database management system 201 that access row 204 do not need to compare the thread read timestamp to CTS 208 or DTS 210. The read threads can check row state 212 for row 204 to determine whether row 204 is "visible" or "invisible." If row state 212 is set to "visible," then the data in row 204 is accessible to the read threads. If row state 212 is set to "invisible," then the data in row 204 is not accessible to the read threads.

Figure 3:
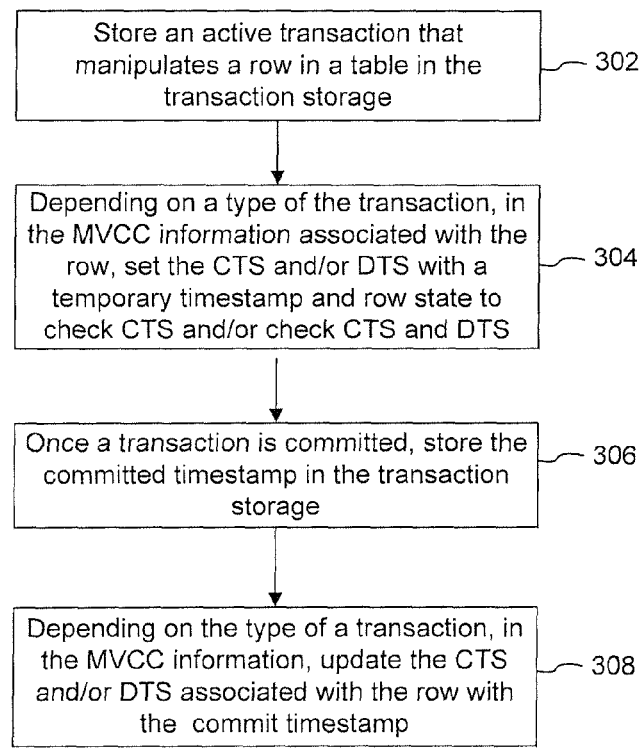
FIG. 3 is a flowchart of a method for storing the MVCC information of a transaction that manipulates a row, according to an example embodiment.

FIG. 3 is a flowchart of a method 300 for storing MVCC information of a transaction that manipulates a row, according to an embodiment. Method 300 can be performed by processing logic that can comprise hardware (e.g., circuitry, dedicated logic, programmable logic, microcode, etc.), software (e.g., instructions run on a processing device), or a combination thereof.

In step 302, a write thread stores a transaction in a transaction storage. For example, client 106 issues a transaction that includes an insert, update or a delete operation on row 204 in table 202. The instructions are stored as associations 216 in transaction storage 214. As discussed above, associations 216 include a row position or offset of rows 204 in table 202 and a type of instruction, such as an insert, update or delete operation.

In step 304, a write thread sets the MVCC information for a row affected by the transaction. For example, the write thread uses the row position information to access MVCC information 206 that corresponds to a row being manipulated by the transaction. Once accessed, the write thread determines whether the transaction creates row 204 in table 202 or destroys row 204 from table 202. If a transaction creates row 204, the write thread sets CTS 208 for row 204 with a temporary timestamp and sets row state 212 to "check CTS". If a transaction deletes row 204, the write thread sets DTS 210 for row 204 with a temporary timestamp and sets row state 212 to "check CTS and DTS".

In step 306, a write thread stores a commit timestamp. For example, client 106 may issue an instruction that commits the transaction in database management system 201. Once committed, the write thread stores the commit timestamp in transaction storage 214.

In step 308, a post-commit thread updates MVCC information with a commit timestamp. Once transaction is committed, the write thread uses associations 216 in transaction storage 214 to retrieve row position for row 204 for which a transaction was committed and accesses MVCC information. Once accessed, if transaction creates row 204, the write thread sets CTS 208 for row 204 with the commit timestamp. If transaction destroys row 204, the write thread sets DTS 210 for row 204 with the commit timestamp.

Figure 4:
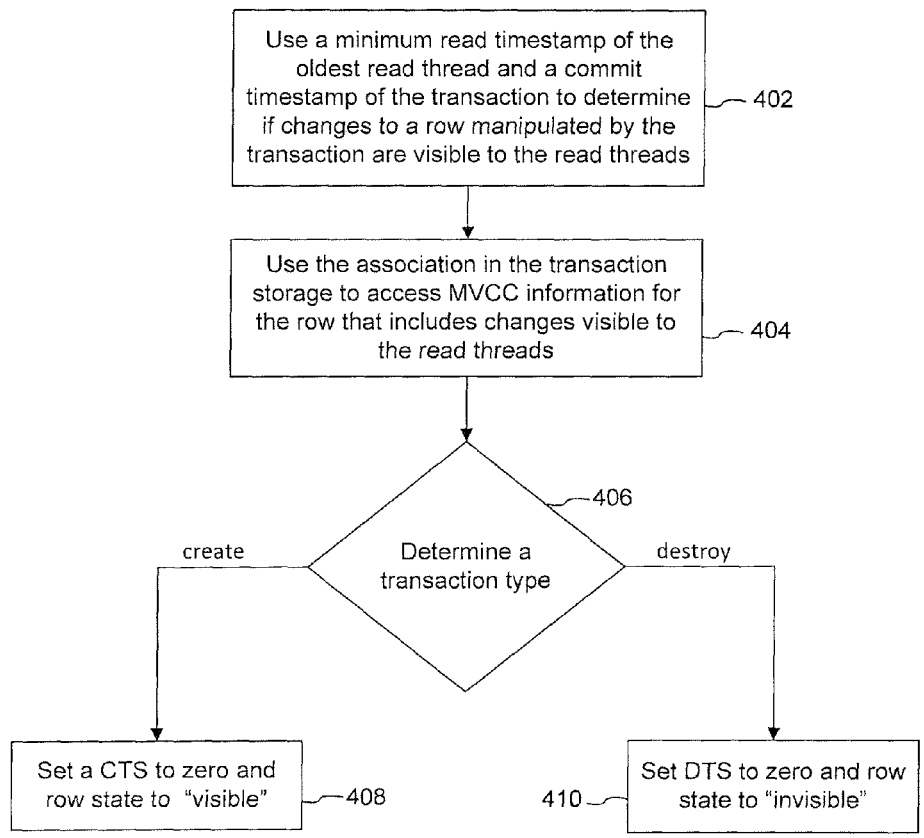
FIG. 4 is a flowchart of a method for implementing garbage collection of the timestamps in the MVCC information, according to an example embodiment.

FIG. 4 is a flowchart for a method 400 for implementing garbage collection of timestamps in MVCC information, according to an embodiment. Method 400 can be performed by processing logic that can comprise hardware (e.g., circuitry, dedicated logic, programmable logic, microcode, etc.), software (e.g., instructions run on a processing device), or a combination thereof. In an embodiment, method 400 occurs after step 308 of method 300.

At step 402, a clean-up thread determines if changes to a row are visible to the read threads. For example, a clean-up thread determines whether changes in transaction storage 214 for row 204 are visible to all read threads in database management system 201. To determine if changes to row 204 are visible, a clean-up thread compares the commit timestamp of a transaction that manipulated row 204 to the minimum read timestamp of the oldest read thread. If the commit timestamp is less than the minimum read timestamp, then the changes to row 204 are visible to all read threads.

At step 404, a clean-up thread uses transaction storage to access MVCC information for the row. For example, the clean-up thread traverses transaction storage 214 and uses row position stored in association 216 for a transaction where the commit timestamp is less than the minimum read timestamp to access MVCC information 206 for row 204.

At step 406, a clean-up thread determines an instruction type. For example, the clean-up thread uses association 216 to determine the type of an instruction that manipulated row 204. If association 216 includes an insert operation that creates row 204, the flowchart proceeds to step 408. If association 216 includes a delete operation that destroys row 204, the flowchart proceeds to step 410. If association 216 includes an update operation, the flowchart proceeds to step 410 and then to step 408 (not shown).

At step 408, a clean-up thread garbage collects CTS. For example, the clean-up thread sets row state 212 to "visible" and CTS 208 to zeroes. Once CTS 208 is set to zeroes, the read threads rely on row state 212 to determine visibility of row 204.

At step 410, a clean-up thread garbage collects DTS. For example, the clean-up thread sets row state 212 to "invisible" and DTS 210 to zeroes. Once DTS 210 is set to zeroes, the read threads rely on row state 212 to determine visibility of row 204.

Figure 5:
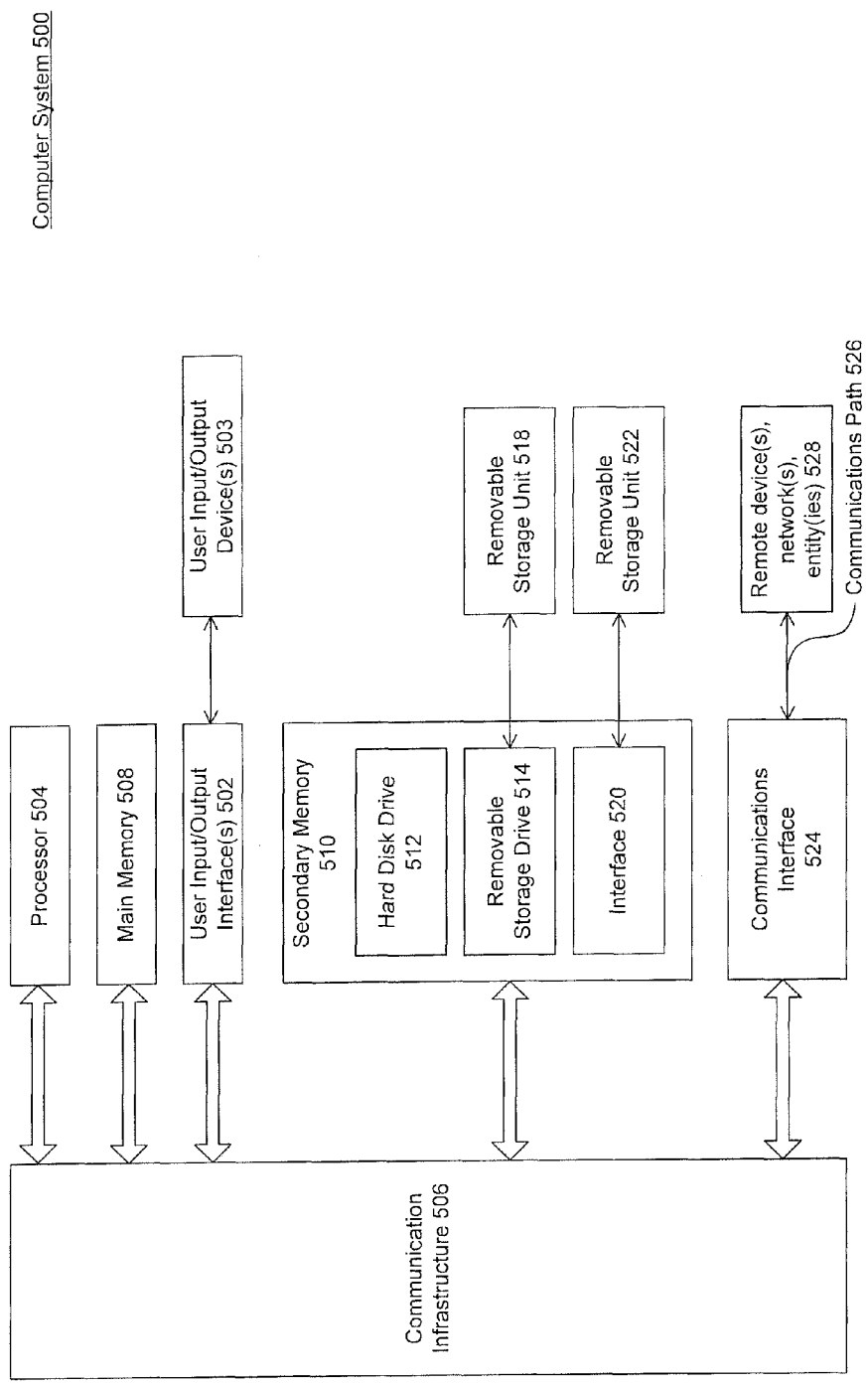
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   determining, using multi-version concurrency control (MVCC) information, when a row manipulated by a write transaction is visible to a plurality of readers accessing a table that includes the row, wherein the row is not visible to at least one reader, wherein the MVCC information for the row includes at least a creation timestamp and a row state;
   determining that the MVCC information includes the creation timestamp and that the row is visible to the plurality of readers including the one reader; and garbage collecting the creation timestamp based on the determination that the row is visible to the plurality of readers including the one reader, wherein subsequent to the garbage collecting the plurality of readers use the row state to determine accessibility of the row in the table, wherein a memory space occupied by the garbage collected creation timestamp is available for a newly created row that is not visible to one or more of the plurality of readers.

2. The method of claim 1, further comprising:
generating an association in a transaction storage, wherein the association associates the write transaction with the row acted on by the write transaction; and
the determining further comprises accessing the MVCC information for the row using the association.

3. The method of claim 2, wherein the association identifies a type of an instruction, wherein the type of the instruction identifies whether the write transaction created or destroyed the row in the table.

4. The method of claim 2, further comprising:
determining a commit timestamp of the write transaction, wherein the commit timestamp is a system timestamp when the write transaction commits;
accessing, using the association, the MVCC information of the row;
storing the commit timestamp as the creation timestamp when the write transaction created the row or as a destruction timestamp when the write transaction deleted the row; and
indicating in the row state to a reader in the plurality of readers to access the creation timestamp or the destruction timestamp to determine accessibility of the row.

5. The method of claim 1, wherein the determining further comprises:
determining a read timestamp of an oldest reader in the plurality of readers, wherein the oldest reader began executing before remaining readers in the plurality of readers; and
comparing the read timestamp to the creation timestamp when the write transaction creates the row or comparing the read timestamp to a destruction timestamp when the write transaction destroys the row.

6. The method of claim 5, where the garbage collecting further comprises:
garbage collecting the creation timestamp when the read timestamp is greater than the creation timestamp; or
garbage collecting the destruction timestamp when the read timestamp is greater than the destruction timestamp.

7. The method of claim 1, wherein the determining further comprises:
identifying a minimum read timestamp, wherein the minimum read timestamp is a read timestamp of an oldest reader;
identifying a new minimum read timestamp, wherein the new minimum read timestamp is a read timestamp of a next oldest reader once the oldest reader completes execution;
determining, using a commit timestamp of the write transaction, that the write transaction committed between the minimum read timestamp and the new minimum read timestamp; and
wherein the garbage collecting further comprises:
garbage collecting the creation timestamp or the destruction timestamp of the write transaction; and
setting the row state to indicate visibility of the row to the plurality of readers.

8. The method of claim 1, wherein the garbage collecting further comprises:
replacing the creation timestamp with a timestamp that indicates that the row is visible to the plurality of readers; and
setting visibility of the row in the row state, wherein the plurality of readers subsequently use the row state to determine visibility of the row.

9. The method of claim 1, wherein the garbage collecting further comprises:
replacing a destruction timestamp with a timestamp that indicates that the row is invisible to the plurality of readers; and
setting visibility of the row in the row state, wherein the plurality of readers subsequently use the row state to determine visibility of the row.

10. The method of claim 1, wherein the row state indicates that the row is visible to the plurality of readers, invisible to the plurality of readers, or visible to a subset of readers in the plurality of readers.

11. A system. comprising:
a memory; and
at least one processor coupled to the memory and configured to:
determine, using multi-version concurrency control (MVCC) information, when a row manipulated by a write transaction is visible to a plurality of readers accessing a table that includes the row, wherein the row is not visible to at least one reader, wherein the MVCC information for the row includes at least a creation timestamp and a row state;
determine that the MVCC information includes the creation timestamp and that the row is visible to the plurality of readers and including the one reader; and
garbage collect the creation timestamp based on the determination that the row is visible to the plurality of readers including the one reader, wherein subsequent to the garbage collecting the plurality of readers use the row state to determine accessibility of the row in the table, wherein a memory space occupied by the garbage collected creation timestamp is available for a newly created row that is not visible to one or more of the plurality of readers.

12. The system of claim 11, wherein the at least one processor is further configured to:
generate an association in a transaction storage, wherein the association associates the write transaction with the row acted on by the write transaction; and
wherein to determine whether the row is visible to the plurality of readers, the at least one processor is further configured to access the MVCC information for the row using the association.

13. The system of claim 12, wherein the association identifies a type of an instruction, wherein the type of the instruction identifies whether the write transaction created or destroyed the row in the table.

14. The method of claim 12, wherein the at least one processor is further configured to:
determine a commit timestamp of the write transaction, wherein the commit timestamp is a system timestamp when the write transaction commits;
access, using the association, the MVCC information of the row;
store the commit timestamp as the creation timestamp when the write transaction created the row or as a destruction timestamp when the write transaction deleted the row; and indicate in the row state to a reader in the plurality of readers to access the creation timestamp or the destruction timestamp to determine accessibility of the row.

15. The system of claim 11, wherein to determine whether to row is visible to the plurality of readers the at least one processor is further configured to:
   determine a read timestamp of an oldest reader in the plurality of readers, wherein the oldest reader began executing before remaining readers in the plurality of readers; and
   compare the read timestamp to the creation timestamp when the write transaction creates the row or comparing the read timestamp to a destruction timestamp when the write transaction destroys the row.

16. The system of claim 15, where to garbage collect the at least one processor is further configured to:
   garbage collect the creation timestamp when the read timestamp is greater than the creation timestamp; or
   garbage collect the destruction timestamp when the read timestamp is greater than the destruction timestamp.

17. The system of claim 11, wherein to determine whether the row is visible to the plurality of readers the at least one processor is further configured to:
   identify a minimum read timestamp, wherein the minimum read timestamp is a read timestamp of an oldest read reader;
   identify a new minimum read timestamp, wherein the new minimum read timestamp is a read timestamp of a next oldest reader once the oldest reader completes execution;
   determine, using a commit timestamp of the write transaction, that the write transaction committed between the minimum read timestamp and the new minimum read timestamp; and
   wherein to garbage collect the at least one processor is further configured to:
      garbage collect the creation timestamp or the destruction timestamp of the write transaction; and
      set the row state to indicate visibility of the row to the plurality of readers.

18. The system of claim 11, to garbage collect the at least one processor is further configured to:
   replace the creation timestamp with a timestamp that indicates that the row is visible to the plurality of readers or a destruction timestamp with a timestamp that indicates that the row is invisible to the plurality of readers; and
   setting visibility of the row in the row state, wherein the plurality of readers subsequently use the row state to determine visibility of the row.

19. The system of claim 11, wherein the row state indicates that the row is visible to the plurality of readers, invisible to the plurality of readers, or visible to a subset of readers in the plurality of readers.

20. A non-transitory computer-readable storage device having instructions stored thereon that, when executed by at least one computing device, causes the at least one computing device to perform operations comprising:
   determining, using multi-version concurrency control (MVCC) information, when a row manipulated by a write transaction is visible to a plurality of readers accessing a table that includes the row, wherein the row is not visible to at least one reader, wherein the MVCC information for the row includes at least a creation timestamp and a row state;
   determining that the MVCC information includes the creation timestamp and that the row is visible to the plurality of readers including the one reader; and
   garbage collecting the creation timestamp based on the determination that the row is visible to the plurality of readers including the one reader, wherein subsequent to the garbage collecting the plurality of readers use the row state to determine accessibility of the row in the table, wherein a memory space occupied by the garbage collected creation timestamp is available for a newly created row that is not visible to one or more of the plurality of readers.

* * * * *